(12) United States Patent
Geng et al.

(10) Patent No.: US 11,378,811 B2
(45) Date of Patent: Jul. 5, 2022

(54) OPTICAL ASSEMBLY WITH CURVED REFLECTIVE POLARIZER FOR HEAD MOUNTED DISPLAY

(71) Applicant: Facebook Technologies, LLC, Menlo Park, CA (US)

(72) Inventors: Ying Geng, Bellevue, WA (US); Yusufu Njoni Bamaxam Sulai, Snohomish, WA (US); Jacques Gollier, Sammamish, WA (US); Brian Wheelwright, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 260 days.

(21) Appl. No.: 16/434,982

(22) Filed: Jun. 7, 2019

(65) Prior Publication Data

US 2019/0384070 A1    Dec. 19, 2019

Related U.S. Application Data

(60) Provisional application No. 62/686,601, filed on Jun. 18, 2018.

(51) Int. Cl.
*G02B 27/28* (2006.01)
*G02B 5/30* (2006.01)
*G02B 27/01* (2006.01)

(52) U.S. Cl.
CPC ......... *G02B 27/286* (2013.01); *G02B 5/3025* (2013.01); *G02B 5/3083* (2013.01); *G02B 27/0172* (2013.01)

(58) Field of Classification Search
CPC ...... G02B 27/286; G02B 27/28; G02B 27/01; G02B 27/0101; G02B 27/017; G02B 27/0172; G02B 5/3025; G02B 5/3083; G02B 5/30; G02B 5/3033; G02B 17/004; G02B 17/08; G02B 17/0804; G02B 17/0856
See application file for complete search history.

(56) References Cited

U.S. PATENT DOCUMENTS

| | | | |
|---|---|---|---|
| 5,644,436 | A | 7/1997 | Togino et al. |
| 9,952,371 | B2 | 4/2018 | Ambur |
| 2018/0039052 | A1 | 2/2018 | Khan et al. |
| 2018/0059296 | A1 | 3/2018 | Ouderkirk et al. |
| 2018/0239146 | A1 | 8/2018 | Bierhuizen et al. |

(Continued)

FOREIGN PATENT DOCUMENTS

| | | | | |
|---|---|---|---|---|
| WO | 0102893 | A1 | 1/2001 | |
| WO | WO-2018211405 | A2 | * 11/2018 | .......... G02B 25/001 |

OTHER PUBLICATIONS

Dereniak et al., Geometrical and Trigonometric Optics, Chapter 11, 38 pages, published 2008 (Year: 2008).*

(Continued)

*Primary Examiner* — Stephone B Allen
*Assistant Examiner* — Adam W Booher
(74) *Attorney, Agent, or Firm* — Freestone Intellectual Property Law PLLC; Aaron J. Visbeek; William J. Pigott (57) ABSTRACT

A lens assembly includes a first optical element and a second optical element. The first optical element includes a flat partially reflective layer. The second optical element includes a curved reflective polarizer layer.

18 Claims, 5 Drawing Sheets

(56) References Cited

U.S. PATENT DOCUMENTS

2020/0081234 A1\* 3/2020 Etter .................. G02B 5/28

OTHER PUBLICATIONS

International Searching Authority, Patent Cooperation Treaty, European Application No. PCT/IB2019/056840, dated Nov. 15, 2019, 7 pages.
Patent Cooperation Treaty, International Search Report, European Application No. PCT/IB2019/056840, dated Nov. 15, 2019, 3 pages.
International Preliminary Report on Patentability for International Application No. PCT/IB2019/056840, dated Dec. 30, 2020, 9 Pages.
First Office Action dated Jan. 25, 2022 for Chinese Patent Application No. 201980035615.9, filed Aug. 12, 2019, 22 pages.

\* cited by examiner

OPTICAL ASSEMBLY WITH CURVED REFLECTIVE POLARIZER FOR HEAD MOUNTED DISPLAY

CROSS-REFERENCE TO RELATED APPLICATIONS

This application claims priority to U.S. provisional Application No. 62/686,601 filed Jun. 18, 2018, which is hereby incorporated by reference.

TECHNICAL FIELD

This disclosure relates generally to optics, and in particular to optical assemblies for Head Mounted Displays.

BACKGROUND INFORMATION

An optical assembly can be included in a head mounted display (HMD) in order to focus image light emitted from a display to an eye of a user that wears the HMD. Improvements to the optical assembly that provide an enhanced user experience are desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an optical assembly are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

The optical assemblies that are described in this disclosure utilize a partially reflective layer on a first optical element reflecting display light to a curved reflective polarizer on a second optical element. The disclosed optical assembly may be utilized to focus image light for an eye of a user of a head mounted display (HMD) and correct for field curvature. These and other embodiments are described in more detail associated with FIGS. 1-5.

Figure 1:
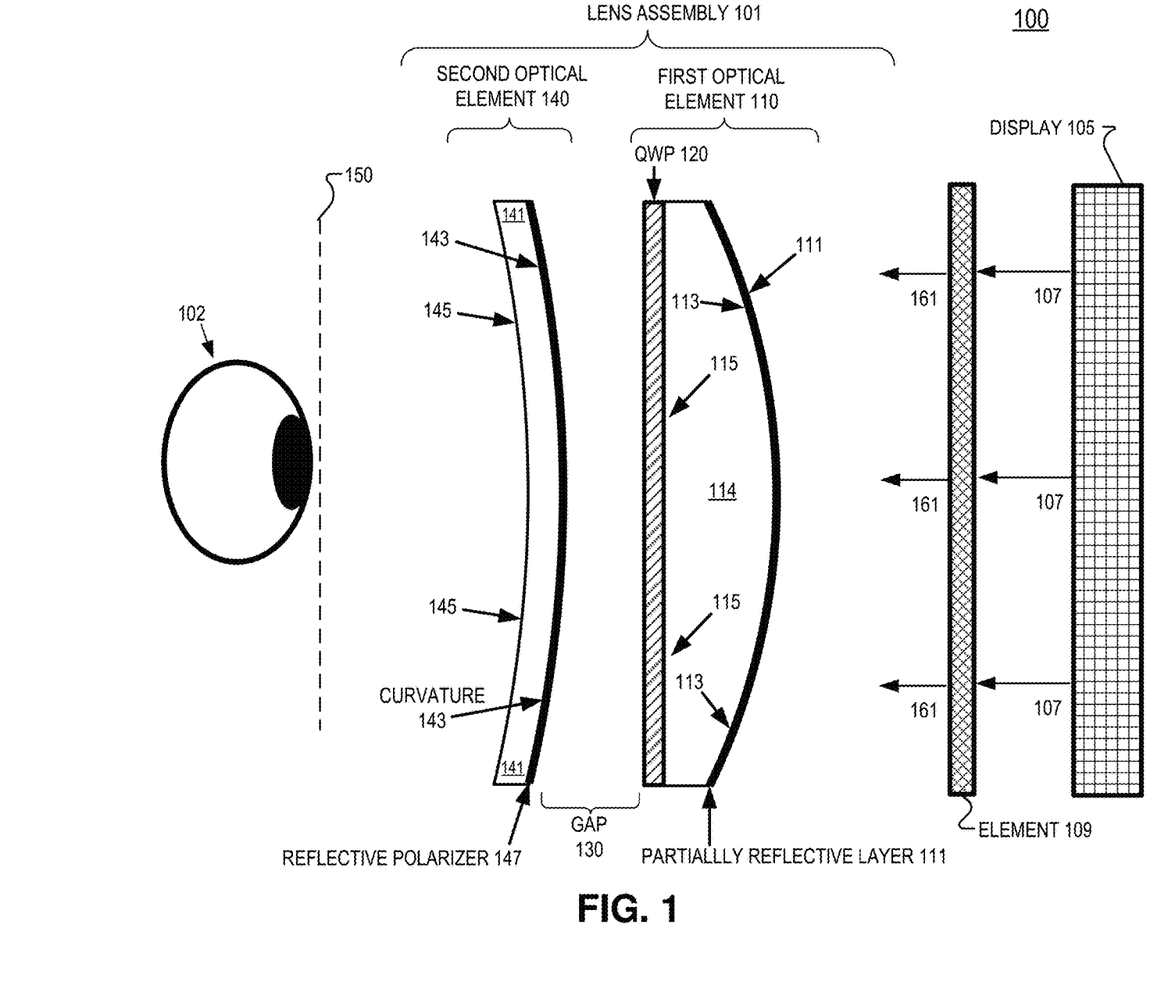
FIG. 1 illustrates an example optical system that includes a display and a lens assembly including a first optical element and a second optical element, in accordance with an embodiment of the disclosure.

FIG. 1 illustrates an example optical system 100 that includes a display 105 and a lens assembly 101 including a first optical element 110 and a second optical element 140, in accordance with an embodiment of the disclosure. Optical system 100 may be utilized in an HMD. FIG. 1 includes an optional optical element 109 disposed between the first optical element 110 and display 105. Optional optical element 109 may be configured to receive display light 107 and generate circularly polarized light 161. Optional optical element 109 may include a quarter-waveplate configured to shift the polarization axis of incident light display light 107 by $\pi/4$ (45 degrees) so that display light 161 has a circular polarization orientation. Optional optical element 109 may also include a linear polarizer if display light 107 is not already have a linear polarization orientation. In some embodiments, display layers included in display 105 generate circularly polarized light an optional optical element 109 is not included in example optical system 100. Lens assembly 101 is configured to focus display light 107 to an eyebox area 150 for an eye 102 of a user wearing an HMD. Display 105 may include a liquid crystal display (LCD), an organic light emitting diode (OLED) display, micro-LED display, quantum dot display, pico-projector, or liquid crystal on silicon (LCOS) display.

Optical element 110 includes a refractive optical element having a first side 113 and a second side 115 that is flat. The refractive optical element may be made of refractive material 114. Refractive material 114 may include, plastic, glass, poly-methyl methacrylate (PMMA), or other acrylic. A partially reflective layer 111 is disposed on first side 113. In one embodiment, partially reflective layer 111 is a mirrored surface configured to transmit approximately 50% of incident light and reflect approximately 50% of incident light. In the illustrated embodiment, first side 113 has a curvature to provide optical power.

Quarter-waveplate (QWP) 120 is also included in first optical element 110, in the illustrated embodiment. QWP 120 may be laminated to the flat second side 115 with an index matching bonding material matched to material 114, in some embodiments. QWP 120 is configured to shift the polarization axis of incident light by $\pi/4$ (45 degrees). Therefore, incident linearly polarized light may be converted to circularly polarized light by QWP 120. Likewise, incident circularly polarized light may be converted to linearly polarized light by QWP 120. QWP 120 may be made of birefringent materials such as quartz, organic material sheets, or liquid crystal, for example. In one embodiment, QWP 120 is designed to be a so called "zero order waveplate" so that the retardance imparted by the QWP 120 remains close to a quarter of a wave independent of the wavelength and angle of incidence of incoming light.

Second optical element 140 is spaced a gap distance 130 from first optical element 110. Second optical element 140 includes a second refractive optical element having a lensing curvature 143. The second refractive optical element includes a refractive material 141. Refractive material 141 may include, plastic, glass, poly-methyl methacrylate (PMMA), or other acrylic. A curved reflective polarizer 147 is disposed on the lensing curvature 143, in the illustrated embodiment of FIG. 1. Curved reflective polarizer 147 is configured to reflect a first orientation of linearly polarized light and to pass (transmit) a second orientation of linearly polarized light that is orthogonal to the first orientation of linearly polarized light. For example, curved reflective polarizer 147 may be configured to reflect p-polarized light and to transmit s-polarized light. In another embodiment, curved reflective polarizer 147 is configured to reflect s-polarized light and transmit p-polarized light. Conventionally, reflective polarizer layers (that selectively reflect light based on polarization) were only suitable for planar surfaces. However, very recently, curved reflective polarizer layers that are suitable for being disposed on curved surfaces such as lens surfaces have become available. Flat film-type reflective polarizers can be curved into shape to fit onto lenses. These reflective polarizers can be either wire-grid type, or multi-layer polymer type. These curved reflective polarizer layers are able to retain their selective reflection of light based on the polarization orientation of the light, even when disposed on a curved surface. Lensing curvature 145 is disposed opposite of lensing curvature 143. In some embodiments (not illustrated) the curved reflective polarizer 147, is disposed on lensing curvature 145 instead of lensing curvature 143.

Figure 2:
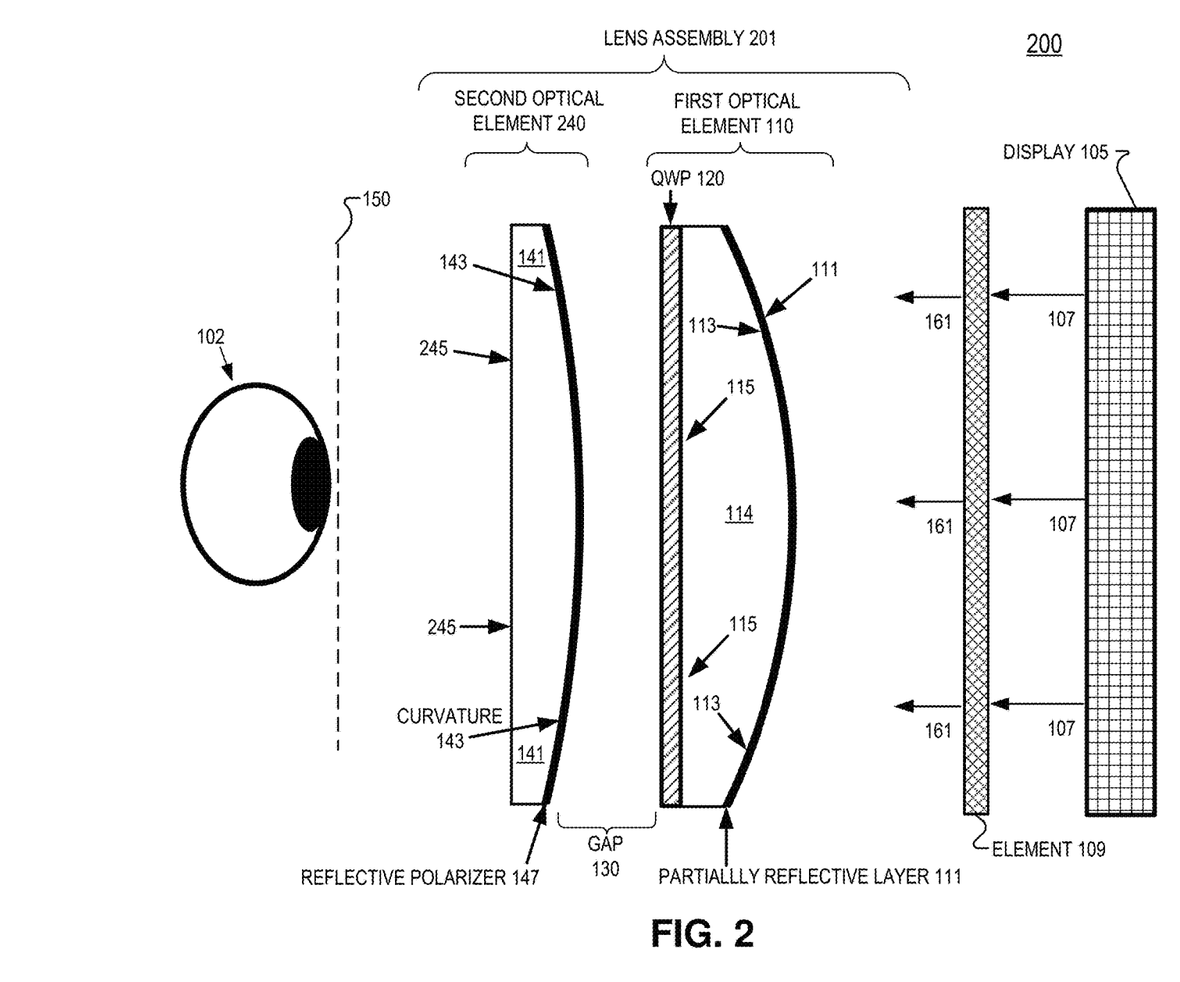
FIG. 2 illustrates an example optical system that includes a display and a lens assembly including a first optical element and a second optical element, in accordance with an embodiment of the disclosure.

FIG. 2 illustrates an example optical system 200 that includes display 105 and a lens assembly 201 including first optical element 110 and a second optical element 240, in accordance with an embodiment of the disclosure. In second optical element 240, surface 245 is flat rather than having a curvature 145, as in FIG. 2. Surface 245 is disposed opposite of lensing curvature 143.

Figure 3:
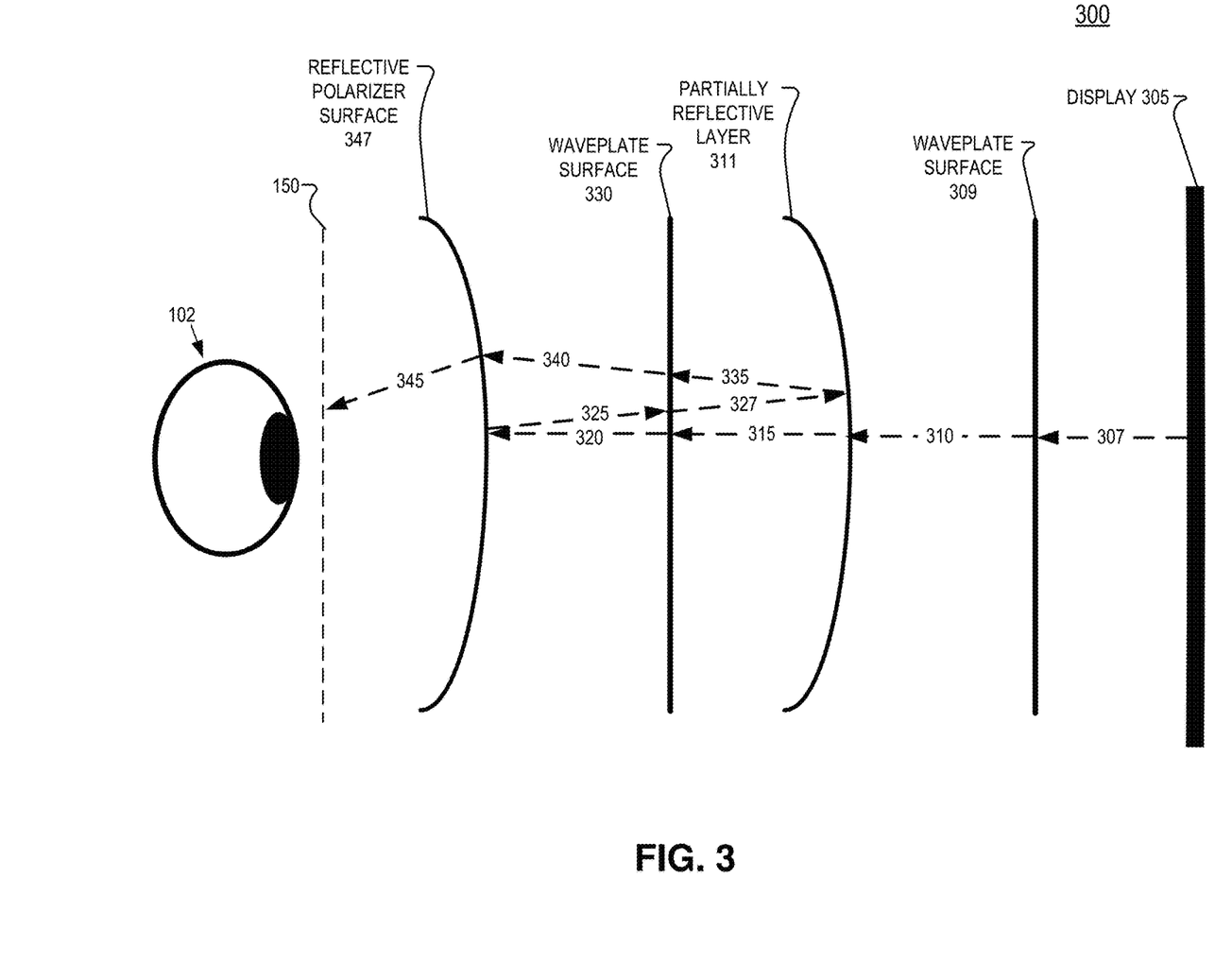
FIG. 3 illustrates an example optical path for display light propagating through optical elements, in accordance with an embodiment of the disclosure.

FIG. 3 illustrates an example optical path for display light propagating through optical elements of example optical assemblies, in accordance with an embodiment of the disclosure. Optical system 300 includes display 305, waveplate surface 309, partially reflective layer 311, waveplate surface 330, and a curved reflective polarizer surface 347. Display 305 may have the properties of display 105. Waveplate surface 309 may be a quarter-waveplate. Partially reflective layer 311 may be an example of partially reflective layer 111, waveplate surface 330 may be an example of QWP 120, and reflective polarizer surface 347 may be an example of curved reflective polarizer 147 disposed on a curvature of the second optical element 140/240.

In operation, display 305 emits display light 307. Display light 307 may be linearly polarized. Display light 307 is rotated 45 degrees (π/4) by waveplate surface 309 to generate circularly polarized light 310. Waveplate surface 309 may be included in optional optical element 109, for example. A portion (not illustrated) of the circularly polarized light 310 is reflected by partially reflective layer 311. The remaining (not reflected) portion of display light 310 is transmitted by partially reflective layer 311 as light 315, which encounters waveplate surface 330. Waveplate surface 330 may rotate the circularly polarized light 315 45 degrees (π/4) to generate linearly polarized display light 320. Linearly polarized display light 320 may be p-polarized light and curved reflective polarizer surface 347 may be configured to reflect p-polarized light and transmit s-polarized light, for example.

Linearly polarized display light 320 is reflected by curved reflective polarizer surface 347 as reflected linearly polarized light 325. Reflected linearly polarized light 325 retains the polarization orientation of linearly polarized display light 320. Linearly polarized light 325 may be rotated 45 degrees by waveplate surface 330 to generate circularly polarized light 327. A portion (not illustrated) of circularly polarized light 327 is transmitted by partially reflective layer 311. The remaining portion of circularly polarized light 327 (not transmitted through layer 311) is reflected as circularly polarized light 335. If circularly polarized light 327 is left-hand circularly polarized light, circularly polarized light 335 will have a right-hand circularly polarized light orientation. If circularly polarized light 327 is right-hand circularly polarized light, circularly polarized light 335 will have a left-hand circularly polarized light orientation. The curvature that partially reflective layer 311 is disposed on may impart optical power (in reflection) to assist in focusing the display light. Circularly polarized light 335 is rotated 45 degrees by waveplate surface 330 to generate orthogonal linearly polarized light 340. Orthogonal linearly polarized light 340 has an orientation that is orthogonal to linearly polarized light 320. Consequently, orthogonal linearly polarized light 340 is transmitted (passed) by curved reflective polarizer surface 347 as light 345 rather than reflected. In one embodiment, orthogonal linearly polarized light 340 is s-polarized light. Light 345 is focused/directed to eyebox area 150 and eye 102 by optical power provided by curvatures 143 and/or 145 formed in refractive material 141.

Configuration that include the curved reflective polarizer 147 disposed on a curvature such as curvature 143 or 145 in the second optical element 140/240 may assist in correcting for field curvature and improving pupil swim. Curvatures 143 and 145 may be relatively shallow curvatures. Changes in the location of the eye within an eyebox area may result in distortion in the content being presented to the user. This undesirable effect is referred to as "pupil swim." Providing a curved reflective polarizer (e.g. curved reflective polarizer 147) opposite a partially reflective layer (e.g. partially reflective layer 111) in a pancake lens configuration may reduce pupil swim significantly in the context of an HMD. Similarly, less interpupillary distance (IPD) sensitivity and less vertical disparity (if optical system is canted) may be achieved. Furthermore, providing a partially reflective layer 111 allows for improved manufacturability of lens assemblies of the disclosure that include QWP 120 since waveplate surfaces are generally manufactured as flat elements that could be laminated to a flat surface 115.

In one embodiment, a center-to-edge thickness ratio of optical elements 110, 140, and/or 240 are less than four to one for injection molding fabrication purposes. In one embodiment, the sag to diameter ratio of the curved reflective polarizer 147 is less than 0.1. In embodiments of the disclosure, the radius of curvature 113 that the partially reflective layer 111 is disposed on and the radius of curvature that curved reflective polarizer 147 is disposed on (either curvature 143 or 145) have the same sign such that in reflection, curvature 113 is concave and focuses/converges rays while the curvature that the curved reflective polarizer 147 is disposed on is convex and diverges rays. This combination may assist in compensating for field curvature. In one embodiment, the total track of the disclosed optical assemblies is less than 23 mm (first lens vertex to display). In embodiments of the disclosure, the field curvature of the system is less than 1 diopter for the full field. Pupil swim in display space may be less than 10 display pixel pitch for all gaze angles. In angle/eye space, pupil swim may be less than 30 arcmin for all gaze angles.

Figure 4:
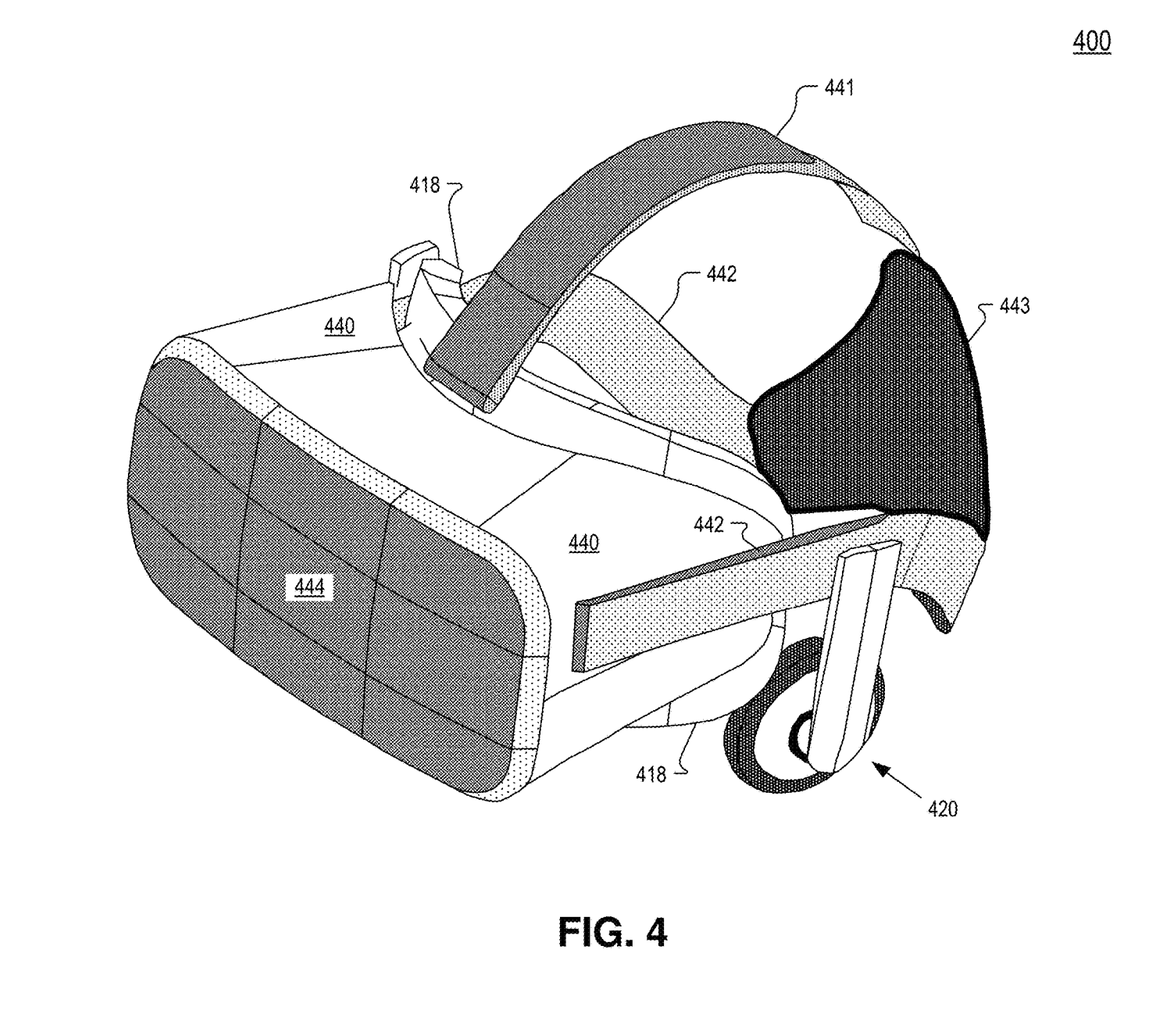
FIG. 4 illustrates an example head mounted display (HMD) that may include optical assemblies of the disclosure, in accordance with an embodiment of the disclosure.

FIG. 4 illustrates an example head mounted display (HMD) 400 that may include systems 100/200/300, in accordance with an embodiment of the disclosure. Example head mounted display (HMD) 400 includes a top structure 441, a rear securing structure 443, and a side structure 442 attached with a viewing structure 440 having a front rigid body 444. The illustrated HMD 400 is configured to be worn on a head of a user of the HMD. In one embodiment, top structure 441 includes a fabric strap that may include elastic. Side structure 442 and rear securing structure 443 may include a fabric as well as rigid structures (e.g. plastics) for securing the HMD to the head of the user. HMD 400 may optionally include earpiece(s) 420 configured to deliver audio to the ear(s) of a wearer of HMD 400.

In the illustrated embodiment, viewing structure 440 includes an interface membrane 418 for contacting a face of a wearer of HMD 400. Interface membrane 418 may function to block out some or all ambient light from reaching the eyes of the wearer of HMD 400.

Example HMD 400 also includes a chassis for supporting hardware of the viewing structure 440 of HMD 400. Hardware of viewing structure 440 may include any of processing logic, wired and/or wireless data interface for sending and receiving data, graphic processors, and one or more memories for storing data and computer-executable instructions. In one embodiment, viewing structure 440 may be configured to receive wired power. In one embodiment, viewing structure 440 is configured to be powered by one or more batteries. In one embodiment, viewing structure 440 may be configured to receive wired data including video data. In one embodiment, viewing structure 440 is configured to receive wireless data including video data.

Viewing structure 440 may include a display for directing image light to a wearer of HMD 400. The display may include the properties of displays 105/305.

Figure 5:
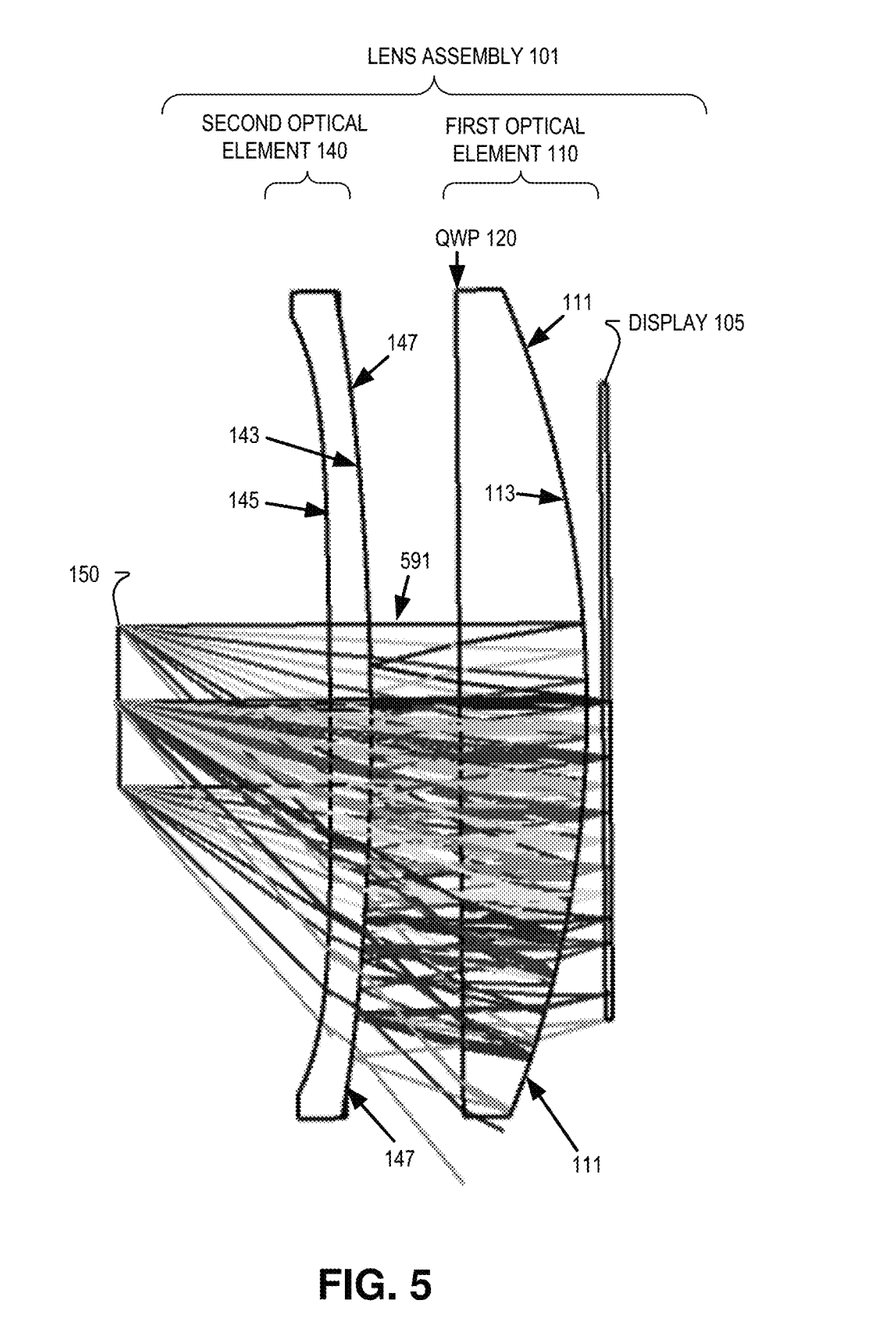
FIG. 5 illustrates an optical system that includes example optical paths of display light, in accordance with an embodiment of the disclosure.

FIG. 5 illustrates an optical system 500 that includes example optical paths of display light that are focused to the eyebox 150 via lens assembly 101, in accordance with an embodiment of the disclosure. Example rays 591 of FIG. 5 illustrate that display light emitted from display 105 pass through partially reflective layer 111 and QWP 120 before being reflected by curved reflective polarizer 147 through QWP back to partially reflective layer 111. The display light reflected by partially reflective layer 111 passes through QWP 120, curved reflective polarizer 147, and the refractive material of second optical element 140 before encountering eyebox area 150.

In one illustrative example, these types of optical systems can work for a range of display panel sizes between 1.4" and 2.5" diagonal, for a VR field of view of at least 85 degrees along the horizontal side (nasal to temporal). If the panel size is much smaller than 1.4" diagonal, performance may degrade, and the optical system may not be able to support a large enough eye-box and/or field of view. If the panel size is much bigger than 2.5" diagonal, a flat reflective polarizer layer may suffice to provide satisfactory performance.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A lens assembly comprising:
   a first optical element including:
   a first refractive optical element having a first side and a second side, wherein the first side has a first lensing curvature that is convex and the second side is flat, wherein a center to edge thickness ratio of the first refractive element is less than 4:1; and
  a partially reflective layer disposed on the first lensing curvature;
a second optical element spaced a distance from the first optical element, the second optical element including:
  a second refractive element having a third side and a fourth side, wherein the third side has a second lensing curvature that is convex, wherein the third side is positioned between the fourth side and the first optical element, wherein a second radius of the second lensing curvature is greater than a first radius of the first lensing curvature, wherein a center to edge thickness ratio of the second refractive element is less than 4:1; and
  a curved reflective polarizer layer disposed on the second lensing curvature, wherein the second side of the first refractive optical element is disposed between the curved reflective polarizer layer and the first side of the first refractive optical element, wherein a sag to diameter ratio of the curved reflective polarizer layer is less than 0.1; and
an air gap separating the first optical element from the second optical element,
wherein a combination of the curved reflective polarizer disposed on the second refractive element and the partially reflective layer disposed on the first optical element is configured to provide a pupil swim of less than 10 display pixel pitch for a plurality of gaze angles for the lens assembly,
wherein a field of curvature for the lens assembly is less than 1 diopter for a full field.

2. The lens assembly of claim 1 further comprising:
a quarter-waveplate disposed between the partially reflective layer and the curved reflective polarizer layer disposed on the second lensing curvature.

3. The lens assembly of claim 2, wherein the first optical element includes the quarter-waveplate and the quarter-waveplate is laminated to the second side of the first refractive optical element.

4. The lens assembly of claim 1, wherein the first lensing curvature provides positive optical power in reflection.

5. The lens assembly of claim 1, wherein the partially reflective layer is configured to transmit approximately 50% of incident display light and reflect approximately 50% of the display light.

6. The lens assembly of claim 1, wherein the fourth side of the second refractive element includes a third lensing curvature.

7. The lens assembly of claim 1, wherein the fourth side of the second refractive element includes a surface that is flat.

8. A head mounted display (HMD) comprising:
a display configured to emit display light;
a first optical element including:
  a first refractive optical element having a first side and a second side, wherein the first side has a first lensing curvature that is convex and the second side is flat, wherein a center to edge thickness ratio of the first refractive element is less than 4:1; and
  a partially reflective layer disposed on the first lensing curvature;
a second optical element spaced a distance from the first optical element, the second optical element including:
  a second refractive element having a third side and a fourth side, wherein the third side has a second lensing curvature that is convex, wherein the third side is positioned between the fourth side and the first optical element, wherein a second radius of the second lensing curvature is greater than a first radius of the first lensing curvature, wherein a center to edge thickness ratio of the second refractive element is less than 4:1; and
  a curved reflective polarizer layer disposed on the second lensing curvature of the second refractive element, wherein the curved reflective polarizer layer is configured to reflect a first polarization orientation of the display light and transmit a second polarization orientation of the display light different from the first polarization orientation, wherein the second side of the first refractive optical element is disposed between the curved reflective polarizer layer and the first side of the first refractive optical element, wherein a sag to diameter ratio of the curved reflective polarizer layer is less than 0.1; and
an air gap separating the first optical element from the second optical element, wherein a combination of the curved reflective polarizer disposed on the second refractive element and the partially reflective layer disposed on the first optical element is configured a pupil swim that is less than 10 display pixel pitch for a plurality of gaze angles in the HMD,
wherein a field of curvature for the first optical element and the second optical element is less than 1 diopter for a full field.

9. The HMD of claim 8 further comprising:
a quarter-waveplate disposed between the partially reflective layer and the curved reflective polarizer layer disposed on the second lensing curvature.

10. The HMD of claim 9, wherein the first optical element includes the quarter-waveplate and the quarter-waveplate is laminated to the second side of the first refractive optical element.

11. The HMD of claim 8, wherein the first lensing curvature provides positive optical power in reflection.

12. The HMD of claim 8, wherein the partially reflective layer is configured to transmit approximately 50% of incident display light and reflect approximately 50% of the display light.

13. The HMD of claim 8, wherein the fourth side of the second refractive element includes a third lensing curvature.

14. The HMD of claim 8, wherein the fourth side of the second refractive element includes a surface that is flat.

15. The HMD of claim 8, wherein the display light is linearly polarized, and wherein the HMD further includes:
a waveplate surface configured to convert the linearly polarized display light to circularly polarized light, the waveplate surface disposed between the display and the partially reflective layer.

16. The HMD of claim 8, wherein a panel size of the display is between 1.4 inches and 2.5 inches diagonal.

17. The HMD of claim 8, wherein a field of view of an optical system including the display, the first optical element, and the second optical element is at least 85 degrees horizontal when measuring from nasal to temporal.

18. A display system comprising:
a display configured to emit display light;
optics configured to convert the display light to circularly polarized display light;
a partially reflective layer disposed on a first lensing curvature of a first refractive element, wherein a center to edge thickness ratio of the first refractive element is less than 4:1, wherein the first lensing curvature is convex;

a quarter-waveplate, wherein the partially reflective layer is disposed between the quarter-waveplate and the optics, wherein the quarter-waveplate is disposed opposite the first lensing curvature on the first refractive element;

a curved reflective polarizer layer disposed on a second lensing curvature of a second refractive element, wherein a center to edge thickness ratio of the second refractive element is less than 4:1, wherein a sag to diameter ratio of the curved reflective polarizer layer is less than 0.1, wherein the second lensing curvature is convex, wherein a second radius of the second lensing curvature is greater than a first radius of the first lensing curvature, wherein the quarter-waveplate is disposed between the curved reflective polarizer layer and the partially reflective layer, wherein the curved reflective polarizer layer is configured to reflect a first polarization orientation of the display light and transmit a second polarization orientation of the display light different from the first polarization orientation; and an air gap separating the first optical element from the second optical element, wherein a combination of the curved reflective polarizer disposed on the second refractive element and the partially reflective layer disposed on the first optical element is configured to provide a pupil swim of less than 10 display pixel pitch for a plurality of gaze angles in the display system, wherein a field of curvature for a combined configuration of the first and second optical elements is less than 1 diopter for a full field.

* * * * *